United States Patent
Yu et al.

(10) Patent No.: US 9,300,959 B2
(45) Date of Patent: Mar. 29, 2016

(54) IMPLICIT DETERMINATION OF COLLOCATED PICTURE FOR TEMPORAL PREDICTION

(71) Applicant: Google Technology Holdings LLC, Mountain View, CA (US)

(72) Inventors: Yue Yu, San Diego, CA (US); Krit Panusopone, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 568 days.

(21) Appl. No.: 13/721,470

(22) Filed: Dec. 20, 2012

(65) Prior Publication Data

US 2013/0163663 A1   Jun. 27, 2013

Related U.S. Application Data

(60) Provisional application No. 61/580,302, filed on Dec. 26, 2011, provisional application No. 61/589,300, filed on Jan. 21, 2012.

(51) Int. Cl.
*H04N 11/02* (2006.01)
*H04N 7/26* (2006.01)
(Continued)

(52) U.S. Cl.
CPC ....... *H04N 19/00575* (2013.01); *H04N 19/105* (2014.11); *H04N 19/136* (2014.11); *H04N 19/159* (2014.11); *H04N 19/503* (2014.11); *H04N 19/423* (2014.11); *H04N 19/573* (2014.11)

(58) Field of Classification Search
CPC .......... H04N 19/00575; H04N 19/105; H04N 19/503; H04N 19/136; H04N 19/159; H04N 19/573; H04N 19/423

USPC .................................................. 375/240.12
See application file for complete search history.

(56) References Cited

U.S. PATENT DOCUMENTS

2003/0107815 A1   6/2003   Redmond
2005/0013365 A1   1/2005   Mukerjee et al.
(Continued)

FOREIGN PATENT DOCUMENTS

EP   1422946   5/2004
WO   WO2011050641   5/2011

OTHER PUBLICATIONS

H.264, ITU-T H.264 Advanced Video Coding for Generic Audiovisual Services, Mar. 2005.*

(Continued)

*Primary Examiner* — Hee-Yong Kim
(74) *Attorney, Agent, or Firm* — Young Basile Hanlon & MacFarlane P.C.

(57) ABSTRACT

In one embodiment, a method determines a block of a current picture and a prediction type associated with the block. Also, the method determines one of a first list of reference pictures and a second list of reference pictures for the block. An encoder or a decoder selects the one of the first list of reference pictures or the second list of reference pictures implicitly without communication of information between the encoder and the decoder indicating which of the first list of reference pictures or the second list of reference pictures was selected. Then, the method sets a reference picture in the selected one of the first list of reference pictures and the second list of reference pictures as a collocated picture for the block. The selected reference picture is used in a temporal prediction process for the block.

12 Claims, 9 Drawing Sheets

(51) Int. Cl.
*H04N 19/503* (2014.01)
*H04N 19/105* (2014.01)
*H04N 19/159* (2014.01)
*H04N 19/136* (2014.01)
*H04N 19/423* (2014.01)
*H04N 19/573* (2014.01)

(56) References Cited

U.S. PATENT DOCUMENTS

| | | | |
|---|---|---|---|
| 2005/0046702 | A1 | 3/2005 | Katayama et al. |
| 2005/0053137 | A1 | 3/2005 | Holcomb |
| 2005/0117646 | A1 | 6/2005 | Joch et al. |
| 2005/0152452 | A1 | 7/2005 | Suzuki |
| 2005/0276448 | A1 | 12/2005 | Pryor |
| 2006/0104349 | A1 | 5/2006 | Joch et al. |
| 2006/0233252 | A1 | 10/2006 | Bhattacharya et al. |
| 2007/0286281 | A1* | 12/2007 | Tsuchiya et al. ......... 375/240.14 |
| 2009/0129472 | A1 | 5/2009 | Panusopone et al. |
| 2009/0168886 | A1 | 7/2009 | Ikeda et al. |
| 2010/0111182 | A1 | 5/2010 | Karczewicz et al. |
| 2011/0002389 | A1 | 1/2011 | Xu et al. |
| 2011/0110428 | A1 | 5/2011 | Chang et al. |
| 2011/0228852 | A1 | 9/2011 | Budagavi |
| 2013/0128967 | A1 | 5/2013 | Yu et al. |
| 2013/0128969 | A1 | 5/2013 | Yu et al. |
| 2013/0128970 | A1 | 5/2013 | Yu et al. |
| 2013/0128977 | A1* | 5/2013 | Yu et al. ............ H04N 19/00575 375/240.16 |
| 2013/0182769 | A1 | 7/2013 | Yu et al. |
| 2013/0202034 | A1 | 8/2013 | Yu et al. |
| 2013/0272375 | A1 | 10/2013 | Yu et al. |
| 2013/0272406 | A1 | 10/2013 | Yu et al. |
| 2014/0023142 | A1 | 1/2014 | Yu et al. |
| 2014/0056356 | A1 | 2/2014 | Yu et al. |

OTHER PUBLICATIONS

Byeong-Moon Jeon. Alexixs Michael Tourapis:"B pictures in JVT" 4. JVT Meeting; 61.MPEG Meeting; Jul. 22,2002-Jul. 26, 2002; Klagenfurt. AT; (Joint Video Team of ISO/IEC JTCI/SC29/WG11 and ITU-T SG.16), No. JVT-DI55. Jul. 26, 2002, PX030005418.

Fang S et al.: "The Construction of Combined List for HEVC",6. JCT-VC Meeting; 97. MPEG Meeting; Jul. 14, 2011-Jul. 22, 2011;Torino;(Joint Collaborative Team on Video Coding of ISO/IEC JTC1/SC29/WG11 and ITU-T SG.16); URL:http://wftp3.itu.int/av-arch/jctvc-site/, No. JCTVC-F573. Jul. 16, 2011.

Guillaume Laroche et al.: "On memory compression for motion vector prediction", Mar. 10, 2011, No. JCTVC0E221, Mar. 10, 2011 all pages.

I-L Kim et al.:"Restriction on motion vector scaling for Merge and AMVP", 8. JCT-VC Meeting; 98. MPEG Meeting; Nov. 21, 2011-Nov. 28, 2011; Geneva; (Joint Collaborative Team on Video Coding of Iso/IEC JTCI/SC29/WG11 and ITU-T-SG.16);URL:http://wftp3.itu.int/av-arch/jctvc-site/, No. JCTVC-G551. Nov. 8, 2011 XP030110535.

ISR and Written Opinion of the International Searching Authority for International Application No. PCTUS2012066146, Feb. 20, 2013, 15 pages.

ISR and Written Opinion of the International Searching Authority for International Application No. PCTUS2012065850, Feb. 27, 2013, 17 pages.

ISR, "ISR Search Report and Written Opinion of the International Searching Authority" for International Application No. ISR/US2013055968 dated Nov. 22, 2013 , 9 pages.

ISR, & Written Opinion of the International Searching Authority fo International Application No. ISR/US2012/065699, Jan. 25, 16 Pages.

ISR, & Written Opinion of the International Searching Authority for International Application No. ISR/US2013024294, Jul. 3, 2013, 13 pages.

ISR, & Written Opinion of the International Searching Authority for International Application No. ISR/US2013025988, May 14, 2013, 11 pages.

ISR, & Written Opinion of the International Searching Authority for International Application No. ISR/US2013025994, May 15, 2013, 12 pages.

ISR, & Written Opinion of the International Searching Authority for International Application No. ISR/US2013054965, Oct. 22, 2013, 12 pages.

Jian-Liang Lin et al.:"Motion vector coding techniques for HEVC", Multimedia Signal Processing (MMSP), 2011 IEE 13th International Workshop on. IEEE Oct. 17, 2011. pp. 1-6, XP03202755.

J-L Lin et al.: "Syntax for AMVP Parsing Error Control", 95. MPEG Meeting; Jan. 24, 2011-Jan. 28, 2011; Daegu; (Motion Ipcture Expert Group or ISO/IEC JTC1/SC29/WG11),, No. m18878, Jan. 23, 2011, all pages.

J-L Lin et al.:"Improved Advanced Motion Vector Prediction", 4. JCT-VC Meeting; 95. MPEG Meeting; Jan. 20, 2011-Jan. 28, 2011;Daegu;(Joint Collaborative Team on Video Coding of ISO/IEC JTC1/SC29/WG11 and ITU-T SG.16); URL:http://wftp3.itu.int/av-arch/jctvc-site/, No. JCTVC-D125. Jan. 15, 2011 XP030008165.

Jung J et al.: Temporal MV predictor modification for MV-Comp, Skip Direct and Merge schemes, 4. JCT-VC Meeting; 95, MPEG Meeting; Jan. 20, 2011-Jan. 28, 2011; Daegu; (Joint Collaborative Team on Video Coding of ISO/IEC JCT1/SC29/WG11 and ITU-T SG16); URL; http://wftp3.itu.int/av-arch/jctvc-site/, No. JCTVC-D164, Jan. 15, 2011, all pages.

Kadono: "Memory Reduction for Temporal Direct Mode", 5, JVT Meeting; Oct. 14, 2002-Oct. 18, 2002; Geneva, CH; (Joint Video Team of ISC/IEC JTC1/SC29/WG11 and ITU-T SG16), No. JVT-E076, Oct. 18, 2002, all pages.

Li (USTC) B et al.: "High-level Syntax: Marking process for non-TMVP pictures", 7. JCT-VC Meeting; 98. MPEG Meeting; Nov. 21,2011-Nov. 30, 2011; Geneva; (Joint Collaborative Team on Video Coding of ISO/IEC JTC1/SC29/WG11 and ITU-T SG. 16); URL: http://wftp3.itu.int/av-arch/jctvc-site/,, No. JCTV-G398, Nov. 8, 2011, all pages.

Li (USTC) B et al: "Constrained temporal motion vector prediction for error resillience", 4. JCT-VC Meeting; 95. MPEG Meeting; Jan. 20, 2011-Jan. 28, 2011; Daegu; (Joint Collaborative Team on Video Coding of ISO/IEC JTC1/SC29/WT11 and ITU-T SG.16); URL:http://wftp3.itu.int/av-arch/jctvc-site/,, No. JCTVC-D139, Jan. 15, 2011, all pages.

Toshiyasu Sugio et al.: CE9: Experiment A, I, J and S Modified derivation processof reference index for skip mode and temporal motion vector predictor Mar. 18, 2011, No. JCTVC-E230, Mar. 18, 2011.

W-S Kim et al.: "Non-CE8: Method of visual coding artifact removal for SAO"> 7. JCT-VC Meeting; 98. MPEG Meeting; Nov. 21, 2011-Nov. 30, 2011; Geneva; (Joint Collaborative Team on Video Coding of ISO-IEC JTC1/SC29/WG11 and ITU-T SG.16),, URL: http://wftp3.itu.int/av-arch/jctvc-site/,, No. JCTVC-G680, Nov. 9, 2011, all pages.

Y-K Wang et al.: AHG15: On sequence parameter set and picture parameter set, 7, JCT-VC Meeting; 98, MPEG Meeting; Nov. 21, 2011-Nov. 20, 2011; Geneva; (Joint Collaborative Team on Video Coding of ISO/IEC JTC1/SC29/WG11 and ITU-T SG16); URL: http://wftp3.itu.int/av-arch/jctvc-site/, No. JCTVC-G334, Nov. 9, 2011, all pages.

Yue Yu et al.: "The Reference Picture Construction of Combined List for HEVC",7. JCT-VC Meeting; 98. MPEG Meeting; Nov. 21, 2011-Nov. 30, 2011;Geneva;(Joint Collaborative Team on Video Coding of ISO/IEC JTC1/SC29/WG11 and ITU-T SG.16); URL:http://wftp3.itu.int/av-arch/jctvc-site/, No. JCT-G717, Nov. 10, 2011.

Yue Yu.: "AHG21: The Improvements on Reference Picture Buffering and List Construction", Joint Collaborative Team on Video Coding of ISO/IEC JTC1/SC29/WG11 and ITU-T SG.16, No. Nov. 2011, JCT-VC Meeting; Nov. 21, 2011- Nov. 30, 2011 Geneva; 98, MPEG Meeting retrieved from the Internet: URL:http://wftp3.int/av-arch/jctvc-site/2011_11_G_GENEVA/[retrieved on May 23, 2013], all pages.

Yue Yuet al.: "Simplification of MVP Design for HEVC",6. JCT-VC Meeting; 97. MPEG Meeting; Jul. 14, 2011-Jul. 22, 2011;

(56) References Cited

OTHER PUBLICATIONS

Torino;(Joint Collaborative Team on Video Coding of ISO/IEC JTC1/SC29/WG11 and ITU-T SG.16); URL:http://wftp3.itu.int/av-arch/jctvc-site/, No. JCTVC-F575. Jul. 19, 2011 XP03009598.

Benjamin Bross, et al., "WD4: Working Draft 4 of High-Efficiency Video Coding ," Joint Collaborative Team on Video Coding (JCT-VC) of ITU-T SG16 WP3 and ISO/IEC JTC1/SC29/WG11, JCTVC-F803_d5, 6th Meeting: Torino, IT, Jul. 14-22, 2011.

Rickard Sjöberg, et al., "Absolute signaling of reference pictures," Joint Collaborative Team on Video Coding (JCT-VC) of ITU-T SG16 WP3 and ISO/IEC JTC1/SC29/WG11, JCTVC-F493, 6th Meeting: Torino, IT, Jul. 14-22, 2011.

Patent Cooperation Treaty, "PCT Search Report and Written Opinion of the International Searching Authority" for International Application No. PCT/US2012/070871 dated Mar. 19, 2013, 15 pages.

Li et al., "Redundancy reduction in B-frame coding at temporal level zero" Joint Collaborative Team on Video Coding (JCT-VC) of ITU-T SG16 WP3 and ISO/IEC JTC1/SC29/WG11; 3rd Meeting: Guangzhou, CN; Oct. 7-15, 2010; 6 pages.

Suzuki eta l., "Extension of uni-prediction simplification in B slices" Joint Collaborative Team on Video Coding (JCT-VC) of ITU-T SG16 WP3 and ISO/IEC JTC1/SC29/WG11; 4th Meeting: Daegu, Lorea; Jan. 20-28, 2011; 8 pages.

Bin Li et al., "Redundancy Reduction in B-Frame Coding at Temporal Level Zero," JCTVC-C278, Oct. 7, 2010, 6 pages.

Ericsson, "Absolute signaling of reference pictures," JCTVC-F493 WG11 No. m20923, JCT-VC of ITU-T SG16 WP3 and ISO/IEC JTC1/SC29/WG11, 6th (JCTVCF493) Meeting: Torino (2011) 16 pages.

Korean Office Action dated Aug. 12, 2015 in related matter. 11 pages.KR10-214-7013280, 17 pages.

Motorola Mobility, "The Construction of Combined List for HEVC," JCTVC-F573-r2, JCT-VC of ITU-T SG16 WP3 and ISO/IEC JTC1/SC29/WG11, 6th (JCTVCF573) Meeting: Torino, IT (Jul. 14-22, 2011) 6 pages.

Office Action in a related matter. Korean Patent Application No. 10-2014-7017195, mailed Jul. 30, 2015 citing new art. 7 pages.

Samsung Electronics Co., Ltd., "Restriction on motion vector scaling for Merge and AMVP" JCTVC-G551, JCT-VC of ITU-T SG16 WP3 and ISO/IEC JTC1/SC29/WG11, 7th (JCTVCG551) Meeting: Geneva, CH (Nov. 21-30, 2011) 4 pages.

\* cited by examiner

IMPLICIT DETERMINATION OF COLLOCATED PICTURE FOR TEMPORAL PREDICTION

CROSS REFERENCE TO RELATED APPLICATIONS

The present disclosure claims priority to:

U.S. Provisional App. No. 61/580,302 for "The Syntax Change for Signaling Collocated Picture for HEVC" filed Dec. 26, 2011; and U.S. Provisional App. No. 61/589,300 for "A More Flexible Way for Signaling Collocated Picture f[o]r HEVC" filed Jan. 21, 2012, the contents of all of which are incorporated herein by reference in their entirety.

The present disclosure is related to U.S. patent application Ser. No. 13/682,590 for "Implicit Determination and Combined Implicit and Explicit Determination of Collocated Picture for Temporal Prediction", filed on Nov. 20, 2012, which claims priority to:

U.S. Provisional App. No. 61/561,931 for "An Implicit Way for Signaling Collocated Picture for HEVC" filed Nov. 21, 2011; and U.S. Provisional App. No. 61/562,426 for "A Combined Way for Signaling Collocated Picture for HEVC" filed Nov. 21, 2011, the contents of all of which are incorporated herein by reference in its entirety.

BACKGROUND

Video compression systems employ block processing for most of the compression operations. A block is a group of neighboring pixels and may be treated as one coding unit in terms of the compression operations. Theoretically, a larger coding unit is preferred to take advantage of correlation among immediate neighboring pixels. Various video compression standards, e.g., Motion Picture Expert Group (MPEG)-1, MPEG-2, and MPEG-4, use block sizes of 4×4, 8×8, and 16×16 (referred to as a macroblock (MB)).

High efficiency video coding (HEVC) is also a block-based hybrid spatial and temporal predictive coding scheme. HEVC partitions an input picture into square blocks referred to as coding tree units (CTUs) as shown in FIG. 1. Unlike prior coding standards, the CTU can be as large as 128×128 pixels. Each CTU can be partitioned into smaller square blocks called coding units (CUs). FIG. 2 shows an example of a CTU partition of CUs. A CTU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of CTU 100. Further, a CU 102-2 has been split into four CUs 102-5, 102-6, 102-7, and 102-8.

Each CU 102 may include one or more blocks, which may be referred to as prediction units (PUs). FIG. 3 shows an example of a CU partition of PUs. The PUs may be used to perform spatial prediction or temporal prediction. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s).

In HEVC, motion vectors (MVs) are predictively coded in a temporal prediction process. For a current PU having one current motion vector and an associated reference index, a motion vector predictor (MVP) is derived from motion vectors of a group of candidates including spatially neighboring or temporally collocated PUs of the current PU. The difference between the current motion vector and the MVP is then determined and coded. This reduces overhead as only the difference is sent instead of information for the current motion vector. Also, when in merge mode, a single motion vector may be applied to a group of spatially neighboring or temporally collocated PUs. Using the same motion vector for a group of PUs also saves overhead. However, the encoder still needs to encode information to indicate to the decoder which temporally collocated PU was selected.

SUMMARY

In one embodiment, a method determines a block of a current picture and a prediction type associated with the block. Also, the method determines one of a first list of reference pictures and a second list of reference pictures for the block. An encoder or a decoder selects the one of the first list of reference pictures or the second list of reference pictures implicitly without communication of information between the encoder and the decoder indicating which of the first list of reference pictures or the second list of reference pictures was selected. Then, the method sets a reference picture in the selected one of the first list of reference pictures and the second list of reference pictures as a collocated picture for the block. The selected reference picture is used in a temporal prediction process for the block.

In one embodiment, a method is provided comprising: determining, by a computing device, a block of a current picture; determining, by the computing device, one of a first list of reference pictures and a second list of reference pictures for the block no matter what the prediction type associated with the block, wherein an encoder or a decoder always selects the one of the first list of reference pictures or the second list of reference pictures for all blocks being encoded or decoded for at least a section of the current picture implicitly without communication of information between the encoder and the decoder indicating which of the first list of reference pictures or the second list of reference pictures was selected; and setting, by the computing device, a reference picture in the selected one of the first list of reference pictures and the second list of reference pictures as a collocated picture for the block, wherein the selected reference picture is used in a temporal prediction process for the block.

In one embodiment, a decoder is provided comprising: one or more computer processors; and a non-transitory computer-readable storage medium comprising instructions that, when executed, control the one or more computer processors to be configured for: one or more computer processors; and a non-transitory computer-readable storage medium comprising instructions that, when executed, control the one or more computer processors to be configured for: determining a block of a current picture; determining a prediction type associated with the block; determining one of a first list of reference pictures and a second list of reference pictures for the block, wherein the decoder selects the one of the first list of reference pictures or the second list of reference pictures implicitly without receiving communication of information from an encoder indicating which of the first list of reference pictures or the second list of reference pictures was selected; and setting a reference picture in the selected one of the first list of reference pictures and the second list of reference pictures as a collocated picture for the block, wherein the selected reference picture is used in a temporal prediction process in a decoding process for the block.

In one embodiment, an encoder is provided comprising: one or more computer processors; and a non-transitory computer-readable storage medium comprising instructions that, when executed, control the one or more computer processors to be configured for: one or more computer processors; and a non-transitory computer-readable storage medium comprising instructions that, when executed, control the one or more computer processors to be configured for: determining a block of a current picture; determining a prediction type associated with the block; determining one of a first list of reference pictures and a second list of reference pictures for the block, wherein the encoder selects the one of the first list of reference pictures or the second list of reference pictures implicitly without sending information to a decoder indicating which of the first list of reference pictures or the second list of reference pictures was selected; and setting a reference picture in the selected one of the first list of reference pictures and the second list of reference pictures as a collocated picture for the block, wherein the selected reference picture is used in a temporal prediction process in an encoding process for the block.

The following detailed description and accompanying drawings provide a better understanding of the nature and advantages of particular embodiments.

DETAILED DESCRIPTION

Described herein are techniques for a video compression system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Implicit Determination of Collocated Picture

Overview

Figure 1:
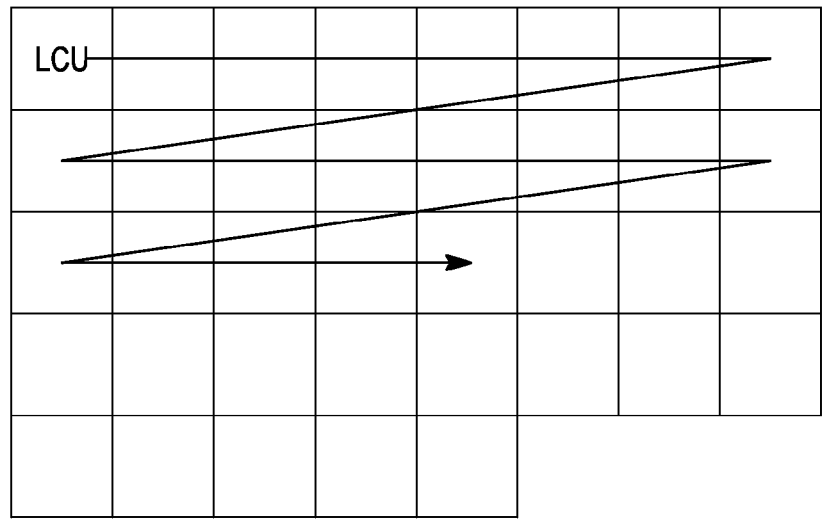
FIG. 1 shows an input picture partitioned into square blocks referred to as coding tree units (CTUs).
Figure 2:
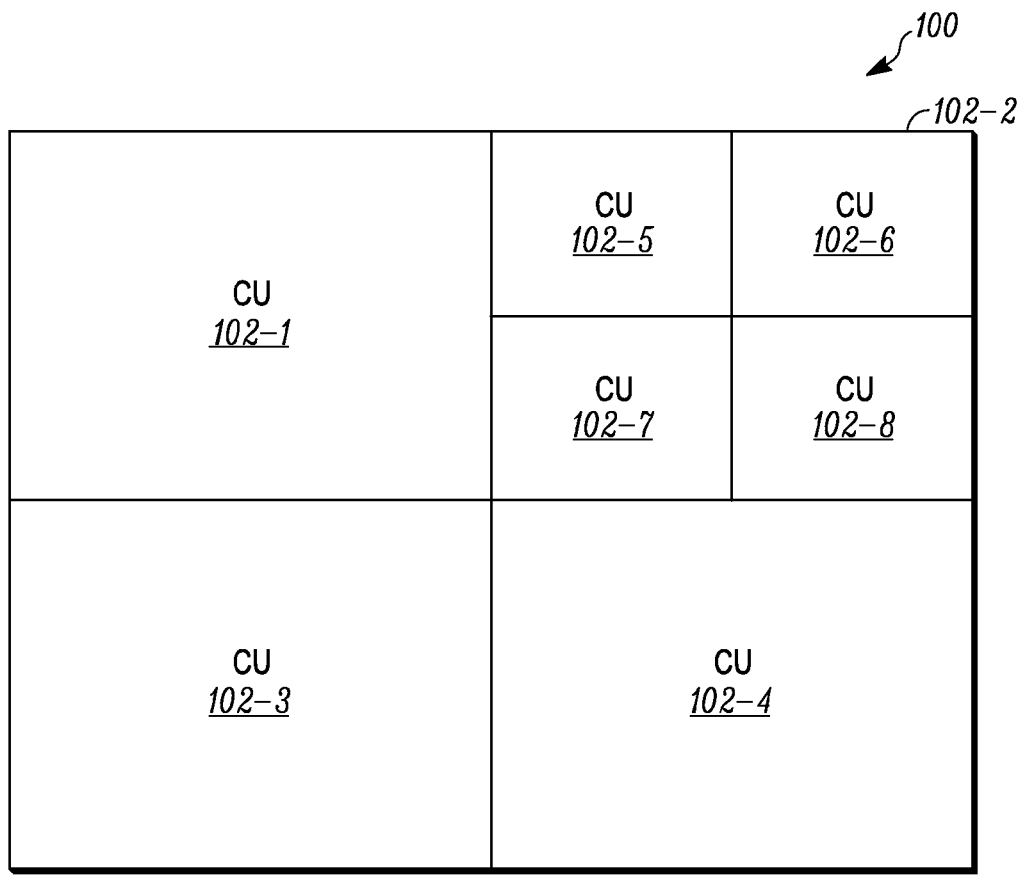
FIG. 2 shows an example of a CTU partition of CUs.
Figure 3:
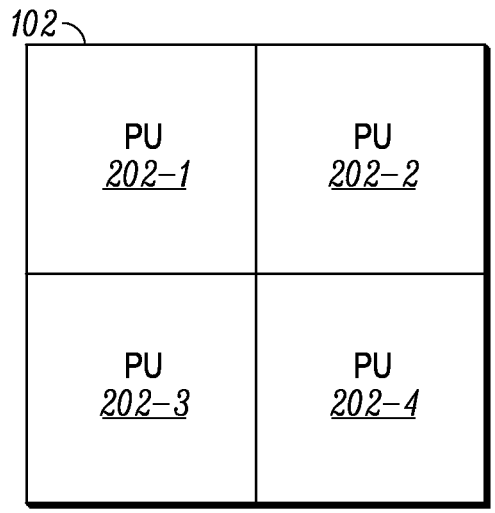
FIG. 3 shows an example of a CU partition of PUs.
Figure 4:
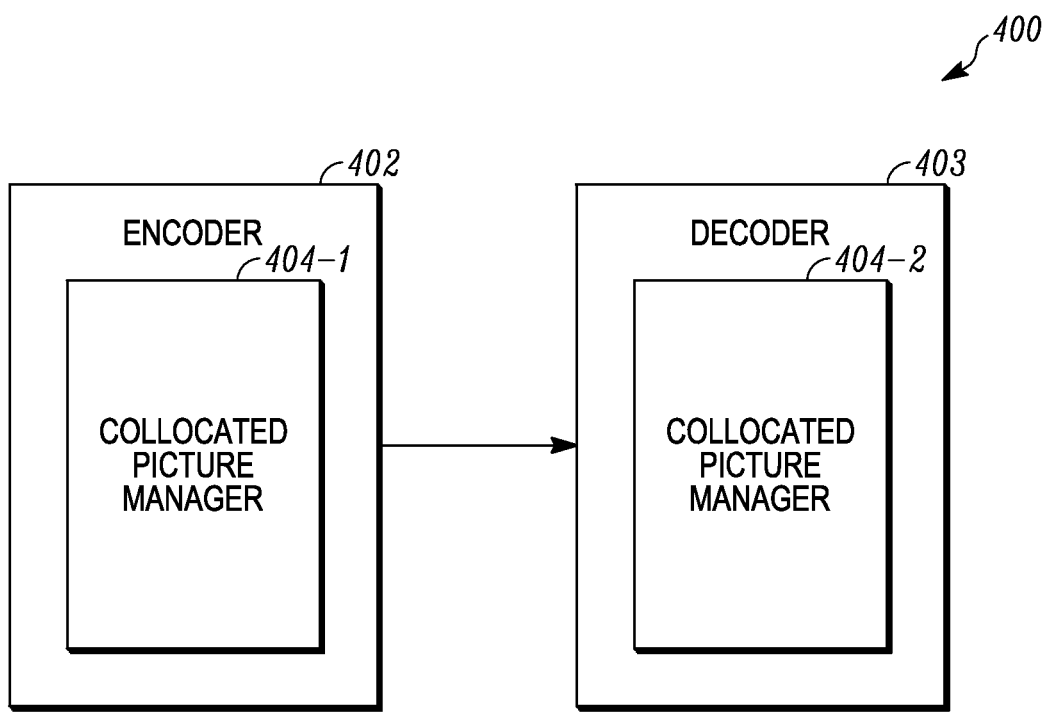
FIG. 4 depicts an example of a system for encoding and decoding video content according to one embodiment.

FIG. 4 depicts an example of a system 400 for encoding and decoding video content according to one embodiment. Encoder 402 and decoder 403 may encode and decode a bitstream using HEVC; however, other video compression standards may also be appreciated.

Encoder 402 includes a collocated picture manager 404-1 and decoder 403 includes a collocated picture manager 404-2. In particular embodiments, both collocated picture managers 404-1 and 404-2 "implicitly" determine which list, such as a list0 or list1, to select a reference picture to use as a collocated picture for a current picture.

The selected collocated picture includes motion vector (MV) information that can be used in a temporal prediction process. For example, a motion vector for a partition in the collocated picture may be used as a candidate for a temporal motion vector predictor (MVP) in advanced motion vector prediction (AMVP) or as a temporal merge/skip candidate motion vector in a merge process. As described above, the MVP or MV for the temporal merge/skip mode may be selected from a group of blocks that are spatially and collocated. When the motion vector of the collocated block is used as a temporal MVP, a difference of the motion vector of the collocated block and the current motion vector of the current block is coded and sent from encoder 402 to decoder 403. When the motion vector of the collocated block is used in a merge process, the current block and the collocated block are merged and use the same motion vector of the collocated block.

The temporal MVP or temporal merge/skip candidate MV is defined as the MV of a collocated block that resides in a reference picture and has the same geometrical position as a current block in the current picture. In one example, given a PU in a current picture, an associated collocated PU can reside in a preceding or subsequent PU in time. The collocated PU can be used as a candidate to enable MVP and merge/skip mode for the current PU. Like with a PU, a collocated block can be provided for a transform unit (TU), CU or a picture itself. Subsequent discussion will reference a picture, although the same could apply to any of the listed subcomponents of a picture or a slice. Additionally, a block may be referenced, which may be a PU, but may also be a TU, CU, a picture, or a slice.

The collocated picture is a reference picture specified in either a list0 or a list1. List0 and list1 include multiple reference pictures. Depending on various characteristics of the video, the reference picture may be selected from one of list0 or list1. In particular embodiments, by implicitly determining which of list0 or list1, encoder 402 and decoder 403 may independently make this determination without any signaling of which of list0 or list1 is selected. For example, encoder 402 does not signal to decoder 403 which of list0 or list1 was selected. Further, encoder 402 may not signal which reference picture the encoder selected as the collocated picture in the selected list0 or list1. Rather, collocated picture manager 404-1 and collocated picture manager 404-2 independently determine the same reference picture to use as the collocated picture for a current picture. However, in other examples, encoder 402 may signal to decoder 403 which reference picture was selected, but not which of list0 or list1 was selected.

Conventionally, a flag collocated_from_l0 flag was used to designate which one of two lists, list0 or list1, includes the collocated picture. The flag can be set to 1 to indicate that the collocated picture shall be derived from list0, or set to 0 to indicate that the collocated picture should be derived from list1. The flag must be encoded in the encoded bitstream, such as in a slice header. This increases overhead in the bitstream.

Particular embodiments remove the flag collocated_from_l0 flag from the encoded bitstream, such as from the slice header. In this case, encoder 402 and decoder 403 implicitly determine the collocated picture from one of list0 or list1 based on different implicit methods, which will be described in more detail below. In one embodiment, implicit means that encoder 402 does not communicate information to decoder 403, such as by sending information for the flag collocated_from_l0_flag, to indicate which list encoder 402 selected the collocated picture from. Rather, encoder 402 and decoder 403 independently determine which of list0 or list1 using the same implicit method from which to select the collocated picture. Further, encoder 402 and decoder 403 select the same reference picture in the selected list0 or list1 as the collocated picture.

As discussed above, different implicit methods may be used to determine which list of list0 or list1 to select the collocated picture from. These implicit methods will be described in more detail below.

Encoding Process

Figure 5:
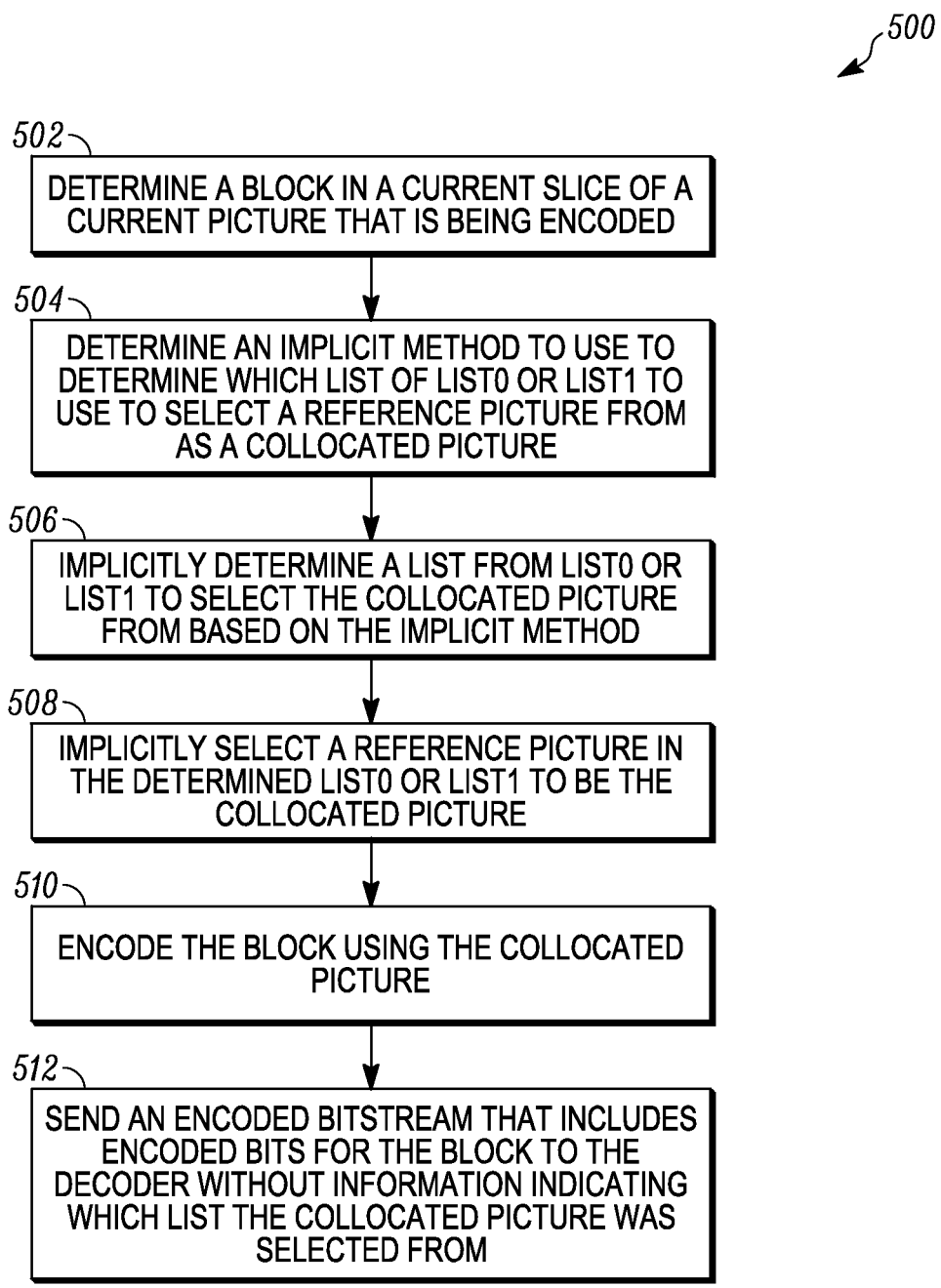
FIG. 5 depicts a simplified flowchart of a method for encoding video according to one embodiment.

FIG. 5 depicts a simplified flowchart 500 of a method for encoding video according to one embodiment. At 502, collocated picture manager 404-1 of encoder 402 determines a block in a current slice of a current picture that is being encoded. The slice may be a group of blocks within the current picture. Also, the block may be a prediction unit (PU), but may also be other portions of the current picture or slice.

At 504, collocated picture manager 404-1 determines an implicit method to use to determine which list of list0 or list1 to use to select a reference picture from as a collocated picture. In one example, collocated picture manager 404-1 may be programmed with a specific implicit method to use, some of which will be described below. Thus, encoder 402 may not be dynamically deciding between various implicit methods to use. However, in other embodiments, collocated picture manager 404-1 may dynamically select one implicit method from a list of possible implicit methods based on characteristics of the video.

At 506, collocated picture manager 404-1 implicitly determines a list from list0 or list1 to select the collocated picture from based on the implicit method. For example, as will be described below, collocated picture manager 404-1 may take into account a prediction type of the current slice (or block or picture), such as whether the current slice is a P slice or B slice. The current slice includes the current block being coded. In another example, collocated picture manager 404-1 may take into account whether the current block is a B predicted block or a P predicted block or the block is part of a B picture or P picture. ?] Collocated picture manager 404-1 may then select one of list0 or list1 based on the prediction type. In other examples, collocated picture manager 404-1 may select which one of list0 or list1 without reference to prediction type.

At 508, collocated picture manager 404-1 implicitly selects a reference picture in the determined list0 or list1 to be the collocated picture. For example, collocated picture manager 404-1 may select the first reference picture in the determined list0 or list1. In other examples, characteristics of the video may be used to determine another reference picture that is not the first reference picture in list0 or list1. For example, collocated picture manager 404-1 selects a reference picture with the shortest temporal distance to the current picture.

At 510, collocated picture manager 404-1 encodes the block using the collocated picture. For example, the collocated picture is used in a candidate list where motion vector information for a collocated block in the collocated picture can be used in a temporal prediction process if selected as described above.

At 512, encoder 402 sends an encoded bitstream that includes encoded bits for the block to decoder 403 without information, such as the flag collocated_from_l0_flag, indicating which list the collocated picture was selected from. Thus, bits for sending which list the collocated picture was selected from are not sent from encoder 402 to decoder 403, which reduces overhead in the encoded bitstream. Further, in one embodiment, the slice header syntax may be changed to remove information regarding the flag collocated_from_l0_flag. For example, the following syntax may be used for the slice header:

| slice_header( ) { | Descriptor |
|---|---|
|   lightweight_slice_flag | u(1) |
|   if( !lightweight_slice_flag ) { | |
|     slice_type | ue(v) |
|     pic_parameter_set_id | ue(v) |
|     if( IdrPicFlag ) { | |
|       idr_pic_id | ue(v) |
|       no_output_of_prior_pics_flag | u(1) |
|     } | |
|     else { | |
|       pic_order_cnt_lsb | u(v) |
|       ref_pic_set_pps_flag | u(1) |
|       if( ! ref_pic_set_pps_flag ) | |
|         ref_pic_set( num_ref_pic_sets ) | |
|       else | |
|         ref_pic_set_idx | u(v) |
|     if( slice_type == P \|\| slice_type == B ) { | |
|       num_ref_idx_active_override_flag | u(1) |
|       if( num_ref_idx_active_override_flag ) { | |
|         num_ref_idx_l0_active_minus1 | ue(v) |
|         if( slice_type == B ) | |
|           num_ref_idx_l1_active_minus1 | ue(v) |
|       } | |
|     } | |
|     ref_pic_list_modification( ) | |
|     ref_pic_list_combination( ) | |
|   if( entropy_coding_mode_flag && slice_type != I) | |
|     cabac_init_idc | ue(v) |
|   first_slice_in_pic_flag | u(1) |
|   if( first_slice_in_pic_flag == 0 ) | |
|     slice_address | u(v) |
|   if( !lightweight_slice_flag ) { | |
|     slice_qp_delta | se(v) |
|     if( sample_adaptive_offset_enabled_flag ) | |
|       sao_param( ) | |
|     if( deblocking_filter_control_present_flag ) { | |
|       disable_deblocking_filter_idc | |
|       if( disable_deblocking_filter_idc != 1) { | |
|         slice_alpha_c0_offset_div2 | |
|         slice_beta_offset_div2 | |
|       } | |
|     } | |
|     ~~If( slice_type==B )~~ | |
|       ~~collocated_from_l0_flag~~ | u(1) |
|     if( adaptive_loop_filter_enabled_flag ) { | |
|       if( !shared_pps_info_enabled_flag ) | |
|         alf_param( ) | |
|       alf_cu_control_param( ) | |
|     } | |
|   } | |
| } | |

As shown above, the syntax has been removed:

```
if( slice_type == B)
    collocated_from_l0_flag.
```

This means that encoder 402 does not signal a value for the collocated_from_l0_flag in the slice header when the slice type is equal to B.

Decoding Process

Figure 6:
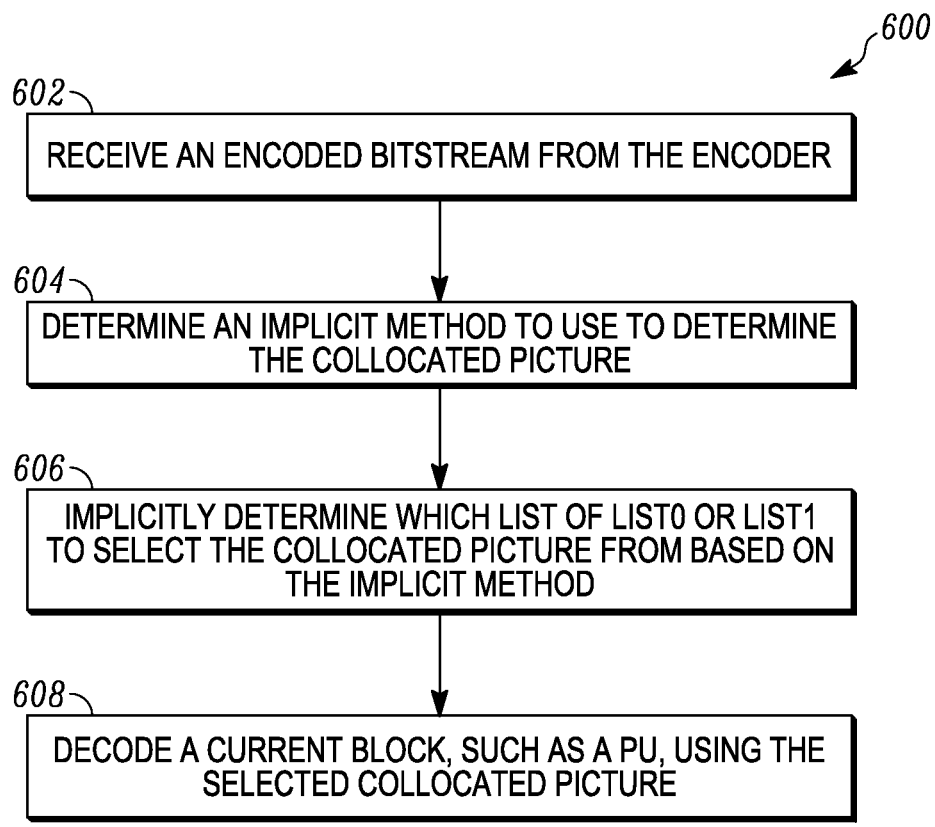
FIG. 6 depicts a simplified flowchart for decoding an encoded bitstream according to one embodiment.

FIG. 6 depicts a simplified flowchart 600 for decoding an encoded bitstream according to one embodiment. At 602, decoder 403 receives an encoded bitstream from encoder 402. The encoded bitstream does not include the flag collocated_from_l0_flag. That is, information on which list of list0 or list1 encoder 402 selected the collocated picture from is not included in the encoded bitstream.

At 604, collocated picture manager 404-2 of decoder 403 determines an implicit method to use to determine the collocated picture. As discussed above, different implicit methods may be used. Also, collocated picture manager 404-2 determines the same implicit method that encoder 402 used. In one embodiment, encoder 402 and decoder 403 may both be programmed to use the same implicit method. In other examples, encoder 402 and decoder 403 may dynamically determine the same implicit method based on characteristics of the video.

At 606, collocated picture manager 404-2 implicitly determines which list of list0 or list1 to select the collocated picture from based on the implicit method. At 608, collocated picture manager 404-2 selects one of the reference pictures in the determined list0 or list1 as the collocated picture. Collocated picture manager 404-2 may select the reference picture using the same method as encoder 402 or encoder 402 may have signaled which reference picture to select.

At 610, decoder 403 decodes a current block, such as a PU, using the selected collocated picture. In one example, the motion vector for the collocated block is used in a temporal prediction process to decode the current block. The decoded residual is then added to a corresponding prediction, which may be either spatial or temporal, to form the new reconstructed PU. When the prediction PU is obtained using temporal prediction collocated picture manager 404 is used in the prediction process to determine the collocated picture to use. A decoded motion vector for the collocated block is used to determine the prediction PU in a merge/skip mode. Also, the decoded motion vector may be used in AMVP as a motion vector predictor.

As discussed above, different implicit methods may be used by encoder 402 and decoder 403. The following will describe three different implicit methods that can be used.

First Implicit Method

Figure 7:
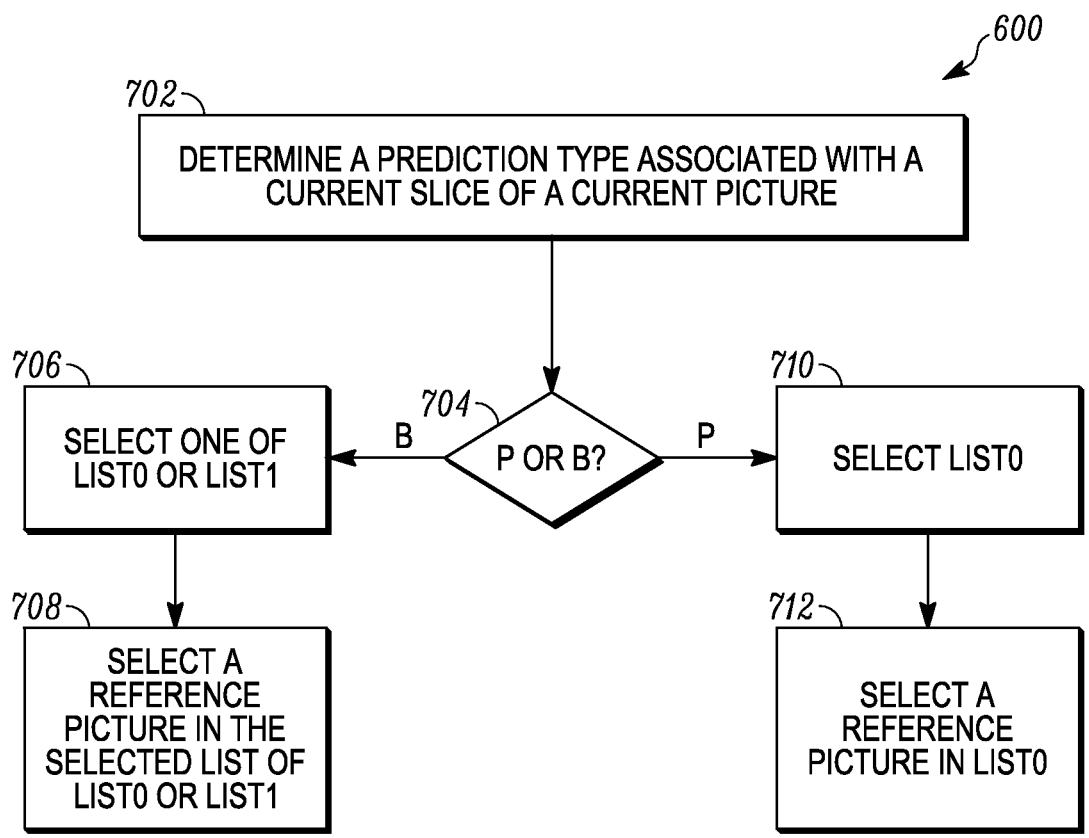
FIG. 7 depicts a simplified flowchart of a first implicit method for determining a collocated picture according to one embodiment.

FIG. 7 depicts a simplified flowchart 700 of a first implicit method for determining a collocated picture according to one embodiment. The steps of the method described in FIG. 7 may be performed independently by both encoder 402 and decoder 403. At 702, collocated picture manager 404 determines a prediction type associated with a current slice of a current picture. The current slice includes the current block being encoded or decoded. The prediction type may be a prediction type associated with the current slice, such as the slice is a P slice or a B slice.

At 704, collocated picture manager 404 determines whether the prediction type is B type or P type. If the prediction type is B type, at 706, collocated picture manager 404 selects one of the lists of list0 or list1. In one embodiment, if the slice type is B, then collocated picture manager 404 always selects list1. In other embodiments, if the slice type is B, then collocated picture manager 404 always selects list0.

At 708, collocated picture manager 404 selects a reference picture in the selected list of list0 or list1. For example, in one embodiment, collocated picture manager 404 always selects the first reference picture in list1. In other embodiments, collocated picture manager 404 always selects the first reference picture in list0.

If the prediction type is P, then at 710, collocated picture manager 404 selects list0. At 712, collocated picture manager 404 selects a reference picture in list0 as the collocated picture. For example, the first reference picture in list0 may be selected.

As discussed above, the reference picture that is selected as the collocated picture may then be used in a temporal prediction process by encoder 402 or decoder 403. The same collocated picture is selected by both encoder 402 and decoder 403.

An embodiment of the above method may be summarized by the following semantic:

If slice_type is equal to B, the variable colPic specifies the picture that contains the co-located partition as specified by RefPicList1[0].

Otherwise (slice_type is equal to P), the variable colPic specifies the picture that contains the co-located partition as specified by RelPicList0[0].

The variable colPic is a variable that specifies the reference picture that contains the collocated partition. The variable colPic is set to the selected reference picture in list0 or list1. For example, if the slice type is equal to B, then the variable colPic is set to the first reference picture in list1. If the slice type is equal to P, then the variable colPic is set to the first reference picture in list0.

Second Implicit Method

Figure 8:
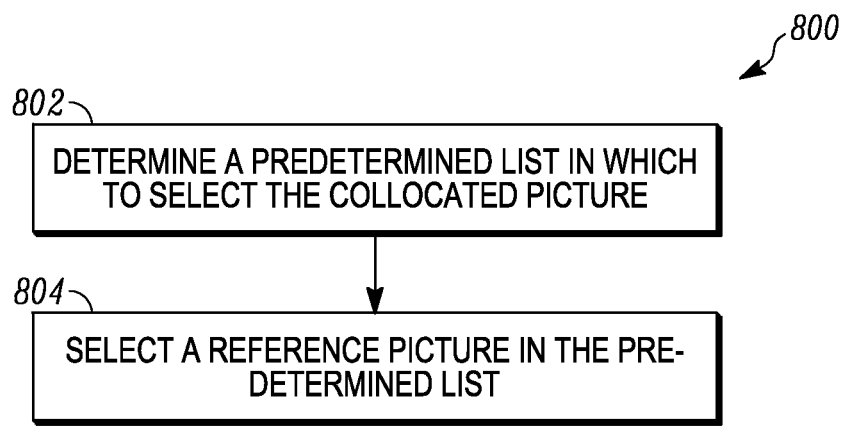
FIG. 8 depicts a simplified flowchart of a second implicit method according to one embodiment.

FIG. 8 depicts a simplified flowchart 800 of a second implicit method according to one embodiment. The steps of the method described in FIG. 8 may be performed independently by both encoder 402 and decoder 403.

At 802, collocated picture manager 404 determines a predetermined list in which to select the collocated picture. For example, instead of determining a prediction type that is used to determine which of list1 or list0 to select, collocated picture manager 404 selects the same pre-determined list0 or list1 no matter what the prediction type. For example, encoder 402 and decoder 403 may be pre-programmed to select from only one of list0 or list1.

At 804, collocated picture manager 404 selects a reference picture in the pre-determined list. For example, collocated picture manager 404 selects the first reference picture in the pre-determined list. In one embodiment, collocated picture manager 404 selects from list0 no matter what the prediction type is and also may select the first reference picture in list0. Then, encoder 402 and decoder 403 use the collocated picture in the temporal prediction process as discussed above.

An embodiment of the above method may be summarized by the following semantic:

the variable colPic specifies the picture that contains the co-located partition as specified by RefPicList0[0].

The variable colPic is set to the selected reference picture in list0 always. Thus, slice type does not matter. Also, the first reference picture in list0 is selected.

Third Implicit Method

Figure 9:
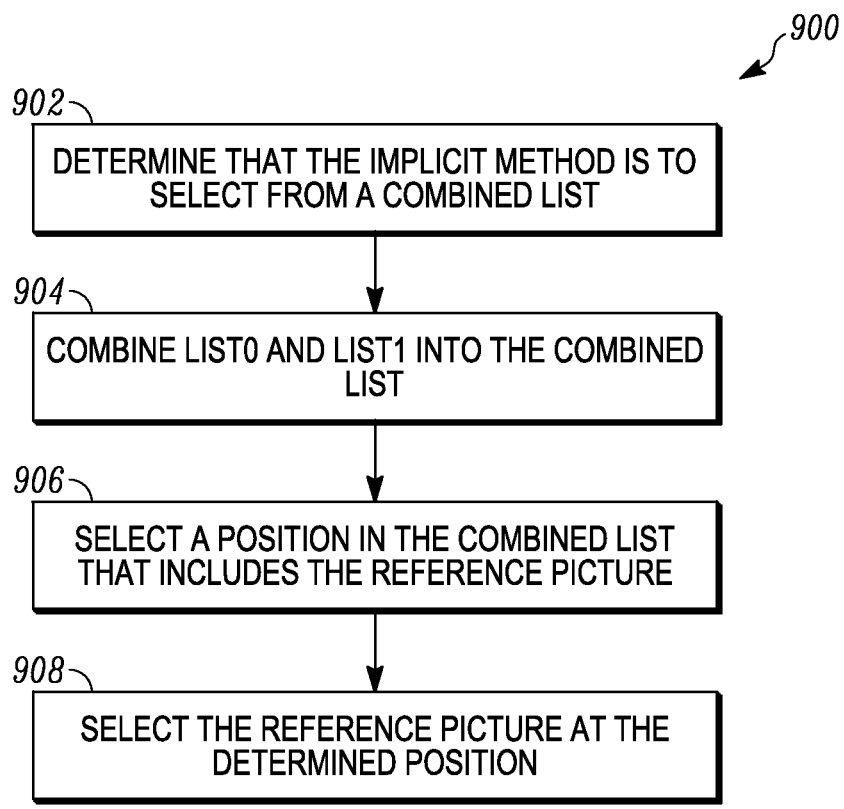
FIG. 9 depicts a simplified flowchart of a third implicit method according to one embodiment.

FIG. 9 depicts a simplified flowchart 900 of a third implicit method according to one embodiment. The steps of the method described in FIG. 9 may be performed independently by both encoder 402 and decoder 403.

At 902, collocated picture manager 404 determines that the implicit method is to select from a combined list. At 904, collocated picture manager 404 combines list0 and list1 into the combined list. That is, the reference pictures in list0 and list1 are combined into one combined list. The sequence of reference pictures in list0 and list1 may be sorted according to an algorithm. For example, temporal distance from the current picture may be used to sort the reference pictures in the combined list. Other methods of sorting the reference pictures may also be used, such as the reference pictures in list0 and list1 may be interleaved according to their original positions in list0 and list1.

At 906, collocated picture manager 404 selects a position in the combined list that includes the reference picture. In one example, the first reference picture in the combined list is always selected. In other examples, another reference picture may be selected at another position based on characteristics of the video. For example, the reference picture that is closest in temporal distance may be selected if the combined list was not sorted by temporal distance. At 908, collocated picture manager 404 selects the reference picture at the determined position.

An embodiment of the above method may be summarized by the following semantic:
the variable colPic specifies the picture that contains the co-located partition as specified by CombinedList [ref_shortest_distance],
where CombinedList is the combined list and ref_shortest_distance indicates the position of the reference picture with the shortest distance to the current picture. The variable colPic is set to the selected reference picture in the combined list. Thus, slice type does not matter. Also, the first reference picture in the combined list is selected.

Example of Collocated Picture Manager 404

Figure 10:
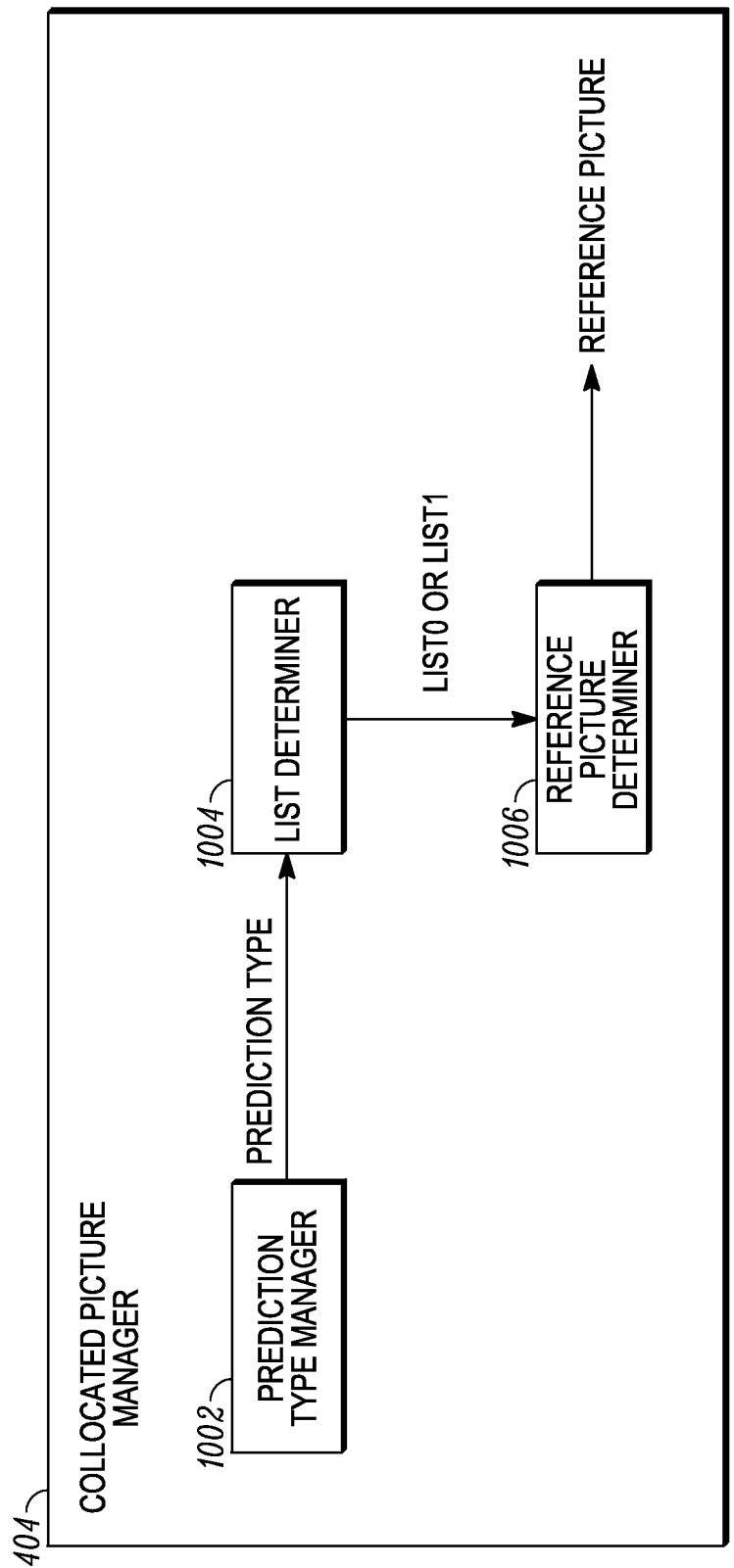
FIG. 10 depicts a more detailed example of a collocated picture manager according to one embodiment.

FIG. 10 depicts a more detailed example of collocated picture manager 404 according to one embodiment. A prediction type determiner 1002 receives video information that is being encoded or decoded. For example, a block that is currently being encoded or decoded may be received. Prediction type determiner 1002 then determines the prediction type, such as whether the block is part of a B slice or P slice, the block is part of a B picture or P picture, or what type of prediction the block is being encoded or decoded with. Prediction type determiner 1002 sends the prediction type of B or P to a list determiner 1004. List determiner 1004 uses one of the implicit methods described above to select one of list0 or list1. List determiner 1004 then outputs the list selection of list0 or list1 to a reference picture determiner 1006.

Reference picture determiner 1006 then selects a reference picture from one of list0 or list1. In some embodiments, the first picture in list0 or list1 may be selected. In other examples, other reference pictures in list0 or list1 may be selected based on characteristics of the video. Reference picture determiner 1006 then outputs the selected reference picture, which is used as the collocated picture. In one embodiment, reference picture determiner 1006 sets the variable colPic to a position in list0 or list1 or in the array RefPicList0 or RefPicList1.

Encoder and Decoder Examples

Figure 11A:
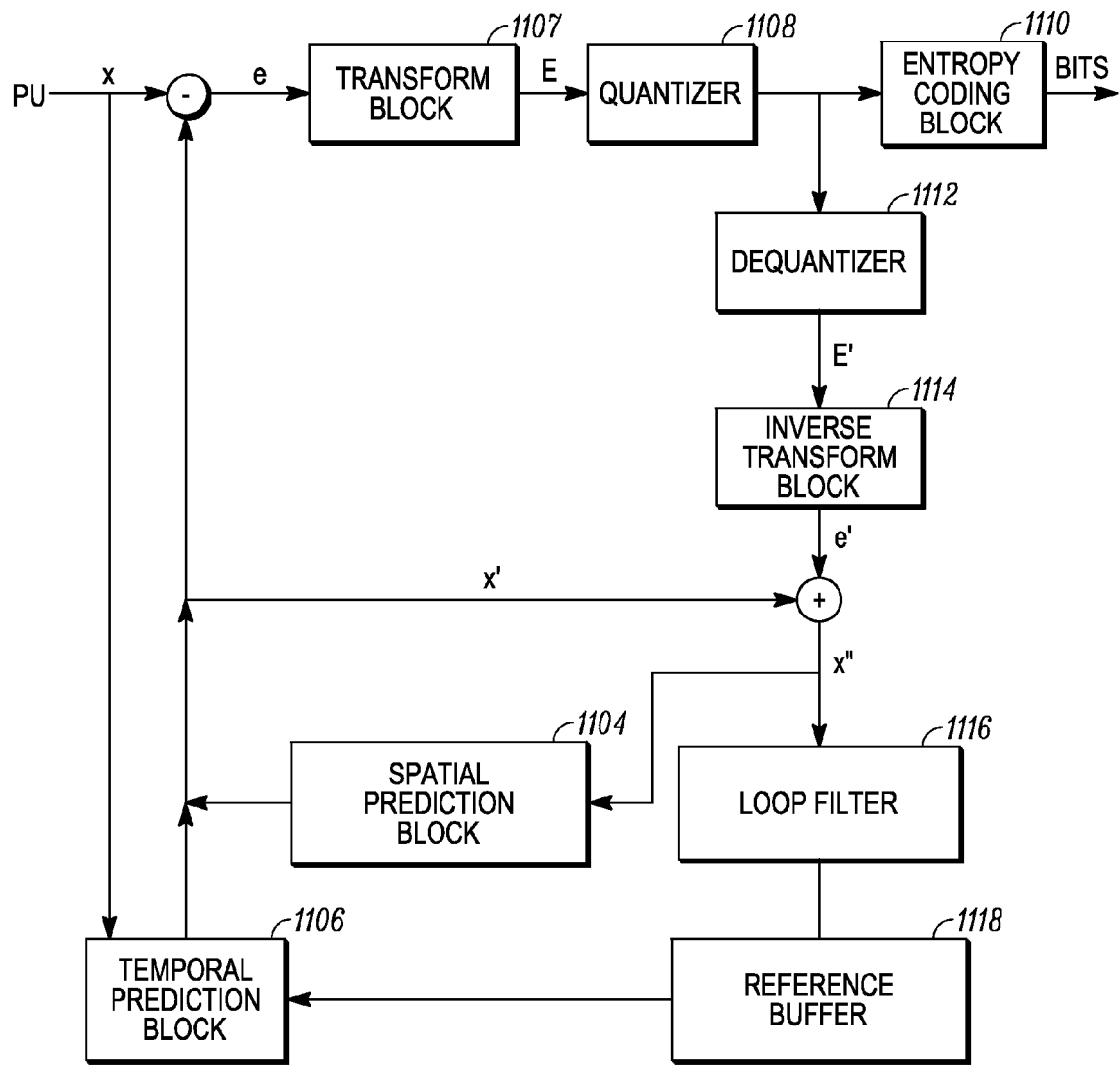
FIG. 11A depicts an example of encoder according to one embodiment.

In various embodiments, encoder 402 described can be incorporated or otherwise associated with a transcoder or an encoding apparatus at a headend and decoder 403 can be incorporated or otherwise associated with a downstream device, such as a mobile device, a set top box or a transcoder. FIG. 11A depicts an example of encoder 402 according to one embodiment. A general operation of encoder 402 will now be described; however, it will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. Spatial prediction relates to intra mode pictures. Intra mode coding can use data from the current input image, without referring to other images, to code an I picture. A spatial prediction block 1104 may include different spatial prediction directions per PU, such as horizontal, vertical, 45-degree diagonal, 135-degree diagonal, DC (flat averaging), and planar, or any other direction. The spatial prediction direction for the PU can be coded as a syntax element. In some embodiments, brightness information (Luma) and color information (Chroma) for the PU can be predicted separately. In one embodiment, the number of Luma intra prediction modes for all block size is 35. In alternate embodiments, the number of Luma intra prediction modes for blocks of any size can be 35. An additional mode can be used for the Chroma intra prediction mode. In some embodiments, the Chroma prediction mode can be called "IntraFromLuma."

Temporal prediction block 1106 performs temporal prediction. Inter mode coding can use data from the current input image and one or more reference images to code "P" pictures and/or "B" pictures. In some situations and/or embodiments, inter mode coding can result in higher compression than intra mode coding. In inter mode PUs 204 can be temporally predictive coded, such that each PU 204 of the CU 202 can have one or more motion vectors and one or more associated reference images. Temporal prediction can be performed through a motion estimation operation that searches for a best match prediction for the PU over the associated reference images. The best match prediction can be described by the motion vectors and associated reference images. P pictures use data from the current input image and one or more previous reference images. B pictures use data from the current input image and both previous and subsequent reference images, and can have up to two motion vectors. The motion vectors and reference pictures can be coded in the HEVC bitstream. In some embodiments, the motion vectors can be syntax elements "MV," and the reference pictures can be syntax elements "refIdx." In some embodiments, inter mode can allow both spatial and temporal predictive coding. The best match prediction is described by the motion vector (MV) and associated reference picture index (refIdx). The motion vector and associated reference picture index are included in the coded bitstream.

Transform block 1107 performs a transform operation with the residual PU, e. A set of block transforms of different sizes can be performed on a CU, such that some PUs can be divided into smaller TUs and other PUs can have TUs the same size as the PU. Division of CUs and PUs into TUs 20 can be shown by a quadtree representation. Transform block 1107 outputs the residual PU in a transform domain, E.

A quantizer 1108 then quantizes the transform coefficients of the residual PU, E. Quantizer 1108 converts the transform coefficients into a finite number of possible values. In some embodiments, this is a lossy operation in which data lost by quantization may not be recoverable. After the transform coefficients have been quantized, entropy coding block 1110 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 402, a dequantizer 1112 de-quantizes the quantized transform coefficients of the residual PU. De-quantizer 1112 then outputs the de-quantized transform coefficients of the residual PU, E'. An inverse transform block 1114 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". Particular embodiments may be used in determining the prediction, such as collocated picture manager 404 is used in the prediction process to determine the collocated picture to use. A loop filter 1116 performs de-blocking on the reconstructed PU, x", to reduce blocking artifacts. Additionally, loop filter 1116 may perform a sample adaptive offset process after the completion of the de-blocking filter process for the decoded picture, which compensates for a pixel value offset between reconstructed pixels and original pixels. Also, loop filter 1116 may perform adaptive loop filtering over the reconstructed PU, which minimizes coding distortion between the input and output pictures. Additionally, if the reconstructed pictures are reference pictures, the reference pictures are stored in a reference buffer 1118 for future temporal prediction. Intra mode coded images can be a possible point where decoding can begin without needing additional reconstructed images.

Figure 11B:
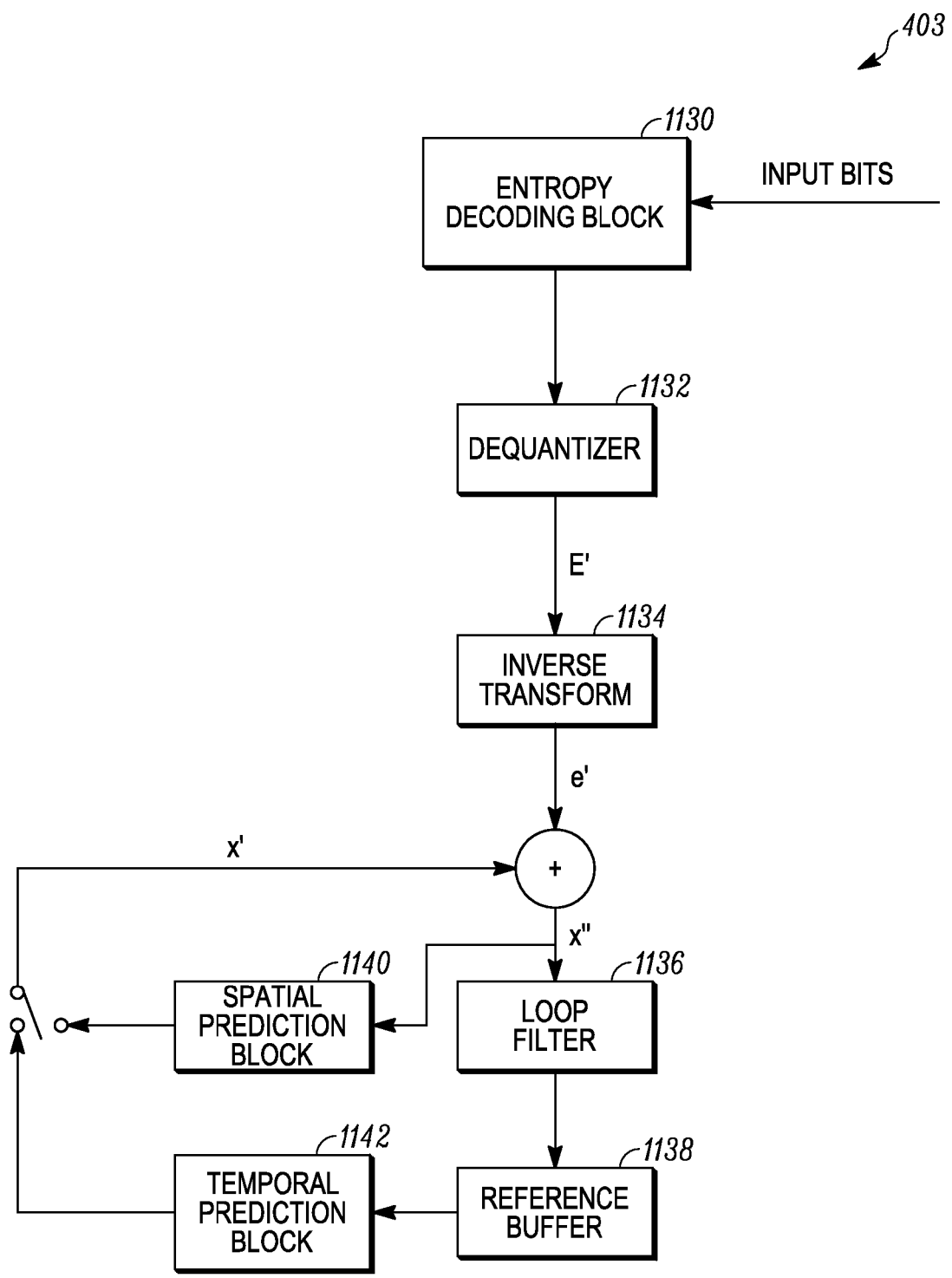
FIG. 11B depicts an example of decoder according to one embodiment.

FIG. 11B depicts an example of decoder 403 according to one embodiment. A general operation of decoder 403 will now be described; however, it will be understood that variations on the decoding process described will be appreciated by a person skilled in the art based on the disclosure and teachings herein. Decoder 403 receives input bits from encoder 402 for encoded video content.

An entropy decoding block 1130 performs entropy decoding on the input bitstream to generate quantized transform coefficients of a residual PU. A de-quantizer 1132 de-quantizes the quantized transform coefficients of the residual PU. De-quantizer 1132 then outputs the de-quantized transform coefficients of the residual PU, E'. An inverse transform block 1134 receives the de-quantized transform coefficients, which are then inverse transformed resulting in a reconstructed residual PU, e'.

The reconstructed PU, e', is then added to the corresponding prediction, x', either spatial or temporal, to form the new reconstructed PU, x". A loop filter 1136 performs de-blocking on the reconstructed PU, x", to reduce blocking artifacts. Additionally, loop filter 1136 may perform a sample adaptive offset process after the completion of the de-blocking filter process for the decoded picture, which compensates for a pixel value offset between reconstructed pixels and original pixels. Also, loop filter 1136 may perform adaptive loop filtering over the reconstructed PU, which minimizes coding distortion between the input and output pictures. Additionally, if the reconstructed pictures are reference pictures, the reference pictures are stored in a reference buffer 1138 for future temporal prediction.

The prediction PU, x', is obtained through either spatial prediction or temporal prediction. A spatial prediction block 1140 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 1106 performs temporal prediction through a motion estimation operation. Particular embodiments may be used in determining the prediction, such as collocated picture manager 404 is used in the prediction process to determine the collocated picture to use. A decoded motion vector is used to determine the prediction PU, x'. Interpolation may be used in the motion estimation operation.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device, a block of a current picture;
   determining, by the computing device, a prediction type associated with the block;
   selecting, by the computing device, one of a first list of reference pictures or a second list of reference pictures for the block by checking the prediction type associated with the block without communication of information between an encoder and a decoder indicating which of the lists of reference pictures was selected;
   selecting, by the computing device, a reference picture in the selected one of the lists of reference pictures without communication of information between the encoder and the decoder indicating which of the reference pictures to select; and
   using a collocated block within the selected reference picture in a temporal prediction process for the block, wherein one of:
   the first list of reference pictures is selected no matter what the prediction type; or
   the second list of reference pictures is selected no matter what the prediction type.

2. The method of claim 1, wherein prediction type comprises a slice type for a slice associated with the block.

3. The method of claim 1, wherein the prediction type is equal to P.

4. The method of claim 1, wherein the prediction type is equal to B.

5. The method of claim 1, wherein a first reference picture in the selected list of reference pictures is selected as the reference picture regardless of the prediction type.

6. The method of claim 1, wherein a reference picture in the selected one of the lists of reference pictures that is closest in temporal distance to the current picture is selected regardless of the prediction type.

7. A method comprising:
   determining, by a computing device, a block of a current picture;
   determining, by the computing device, one of a first list of reference pictures and a second list of reference pictures for the block no matter what prediction type is associated with the block, wherein an encoder or a decoder always selects the one of the first list of reference pictures or the second list of reference pictures for all blocks being encoded or decoded for at least a section of the current picture implicitly without communication of information between the encoder and the decoder indicating which of the first list of reference pictures or the second list of reference pictures was selected; and
   setting, by the computing device, a reference picture in the selected one of the first list of reference pictures and the second list of reference pictures as a reference picture for the block, wherein a collocated block within the selected reference picture is used in a temporal prediction process for the block.

8. The method of claim 7, wherein determining one of the first list of reference pictures and the second list of reference pictures for the block comprises always determining the first list of reference pictures no matter what the prediction type.

9. The method of claim 7, wherein determining one of the first list of reference pictures and the second list of reference pictures for the block comprises always determining the second list of reference pictures no matter what the prediction type.

10. A decoder comprising:
    one or more computer processors; and
    a non-transitory computer-readable storage medium comprising instructions that, when executed, control the one or more computer processors to be configured for:
    determining a block of a current picture;
    determining a prediction type associated with the block;
    selecting one of a first list of reference pictures or a second list of reference pictures for the block, wherein the decoder selects the one of the lists of reference pictures by checking the prediction type and without receiving communication of information from an encoder indicating which of the lists of reference pictures was selected;
    selecting a reference picture in the selected one of the lists of reference pictures as a reference picture for the block without receiving communication of information from the encoder indicating which of the reference pictures to select; and
    using a collocated block within the selected reference picture in a temporal prediction process in a decoding process for the block, wherein when the prediction type is equal to B, the second list of reference pictures is selected.

11. The decoder of claim 10, wherein prediction type comprises a slice type for a slice associated with the block.

12. A decoder comprising:
    one or more computer processors; and
    a non-transitory computer-readable storage medium comprising instructions that, when executed, control the one or more computer processors to be configured for:
    determining a block of a current picture;
    determining a prediction type associated with the block;
    selecting one of a first list of reference pictures or a second list of reference pictures for the block, wherein the decoder selects the one of the lists of reference pictures by checking the prediction type and without receiving communication of information from an encoder indicating which of the lists of reference pictures was selected;
    selecting a reference picture in the selected one of the lists of reference pictures as a reference picture for the block without receiving communication of information from the encoder indicating which of the reference pictures to select; and
    using a collocated block within the selected reference picture in a temporal prediction process in a decoding process for the block, wherein a reference picture in the selected one of the lists of reference pictures that is closest in temporal distance to the current picture is selected regardless of the prediction type.

\* \* \* \* \*